(12) United States Patent
Doleschel et al.

(10) Patent No.: US 9,267,558 B2
(45) Date of Patent: Feb. 23, 2016

(54) SHAFT MOUNTED ROTOR BRAKE

(71) Applicant: AIRBUS HELICOPTERS DEUTSCHLAND GMBH, Donauworth (DE)

(72) Inventors: Andreas Doleschel, Grosshelfendorf (DE); Roberto Gusmini, Munich (DE); Sophie De Lamarliere, Munich (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 84 days.

(21) Appl. No.: 14/065,620

(22) Filed: Oct. 29, 2013

(65) Prior Publication Data
US 2015/0114768 A1 Apr. 30, 2015

(51) Int. Cl.
*F16D 55/26* (2006.01)
*F16D 55/36* (2006.01)
*B64C 27/12* (2006.01)
*F16D 55/40* (2006.01)

(52) U.S. Cl.
CPC ............... *F16D 55/36* (2013.01); *B64C 27/12* (2013.01); *F16D 55/40* (2013.01)

(58) Field of Classification Search
CPC . F16D 2121/14; F16D 55/36; F16D 65/0972; F16D 55/32
USPC ............ 188/2, 72.6, 72.3, 159, 185; 475/159; 192/4
See application file for complete search history.

(56) References Cited

U.S. PATENT DOCUMENTS

| | | | | |
|---|---|---|---|---|
| 2,968,369 A | * | 1/1961 | Parrett | 188/71.2 |
| 4,129,202 A | | 12/1978 | Winters et al. | |
| 4,219,107 A | * | 8/1980 | Frosch et al. | 188/134 |
| 4,961,485 A | * | 10/1990 | Huff et al. | 192/221.1 |
| 5,460,578 A | | 10/1995 | Giuriati et al. | |
| 6,077,042 A | | 6/2000 | Pancotti et al. | |
| 6,254,504 B1 | | 7/2001 | Goi et al. | |
| 6,508,336 B1 | * | 1/2003 | El-Kassouf | 188/71.5 |
| 7,168,533 B2 | * | 1/2007 | Podratzky | 188/185 |
| 2008/0277213 A1 | | 11/2008 | Doleschel et al. | |

FOREIGN PATENT DOCUMENTS

| | | |
|---|---|---|
| DE | 69311484 | 10/1997 |
| DE | 10343055 | 5/2005 |
| EP | 0894712 | 2/1999 |
| KR | 20100087523 | 8/2010 |

OTHER PUBLICATIONS

Extended European Search Report for EP 12400039.9, Dated Feb. 4, 2013, 6 Pages.

* cited by examiner

*Primary Examiner* — Robert A Siconolfi
*Assistant Examiner* — Mahbubur Rashid
(74) *Attorney, Agent, or Firm* — Brooks Kushman P.C.

(57) ABSTRACT

A shaft mounted rotor brake (7) with at least one braking force absorption element non-rotatable connected to said shaft (1). A stationary brake actuator (8, 24) is mounted to a rotor gear box housing (4). Said stationary brake actuator (8, 24) actuates a braking force transmission element (17, 23) that is functionally coupled to the at least one braking force absorption element (2) so as to exert a braking effect. At least one rotor brake deactivation device (6, 9, 25) is provided. The at least one braking force absorption element comprises lamellas (2) interacting with stationary lamellas (3), said lamellas (2) and stationary lamellas (3) being arranged inside of the rotor gear box housing (4) with oil inside.

9 Claims, 3 Drawing Sheets

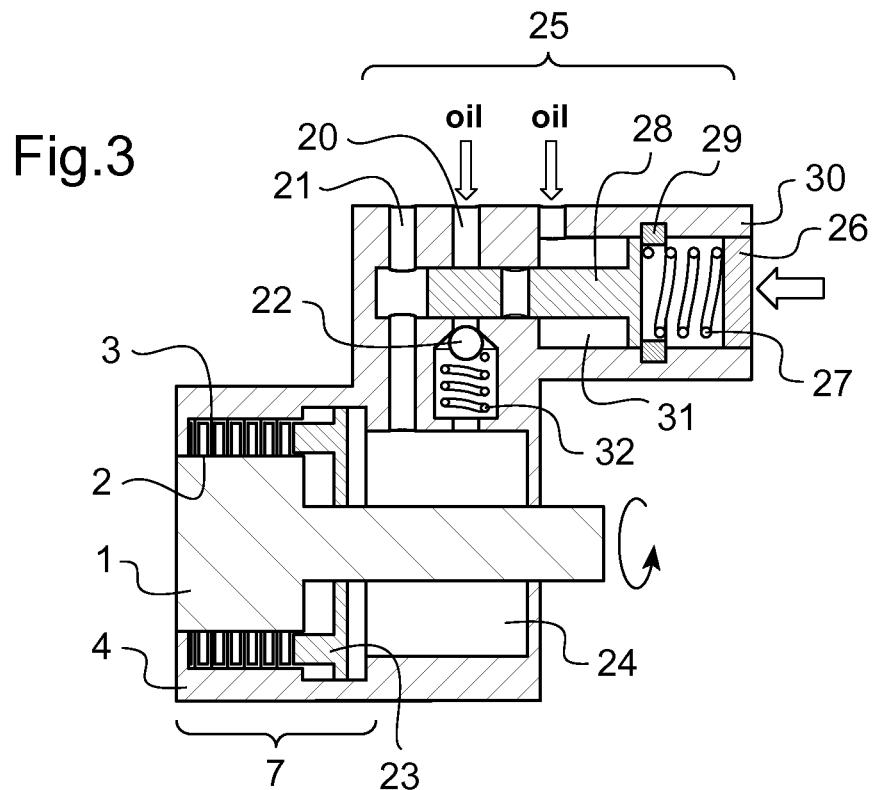
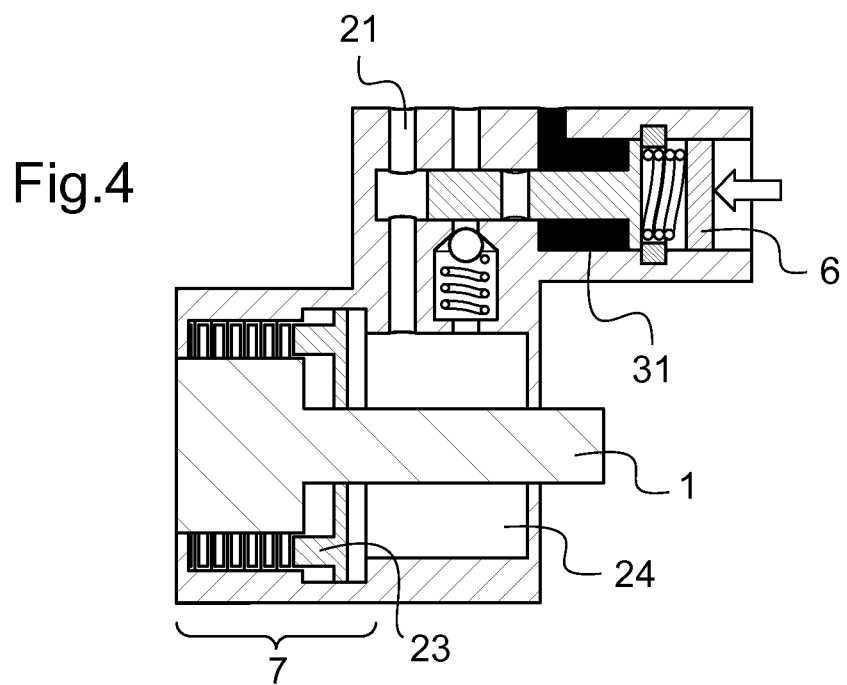

SHAFT MOUNTED ROTOR BRAKE

CROSS REFERENCE TO RELATED APPLICATION

This application is related to European patent application No. EP 12 400039.9 filed Sep. 24, 2012.

BACKGROUND OF THE INVENTION

1. Field of the Invention

The invention is related to a shaft mounted rotor brake with the features of the preamble of claim 1.

2. Description of Related Art

Rotor brakes are used in helicopters and in some types of helicopters they even are a safety-relevant system.

The document DE 693 11 484 T2 discloses a transmission with integrated brake particularly usable for vehicles. The transmission includes, in an oil bath inside a containment and support casing, an epicyclic reduction unit which is kinematically connectable to a drive unit by means of at least two gears, of which the driven one is axially fixed, is coaxial to a sun gear of the reduction unit and is associated therewith by means of a splined coupling. A disk brake is arranged between the epicyclic reduction unit and the driven gear and has at least one first disk rigidly coupled to an internally toothed ring gear which is rigidly coupled to the containment casing and at least one second disk which is rigidly coupled so as to rotate together with the driven gear. The disk brake is associated with axially movable packing pushers.

The document EP 0894 712 A2 discloses a helicopter rotor brake having a disk connected angularly to a helicopter rotor. A brake caliper has friction members cooperating with the disk; and an actuating device for moving the brake caliper, parallel to the plane of the disk, between a work position engaging the disk. The brake caliper may be operated to brake the rotor, and a release position releasing the disk and wherein any possibility of the friction members interacting with the disk is prevented.

The document DE 103 43 055 A1 discloses a rotor shaft mounted rotor brake with a braking force absorption element non-rotatable connected to said rotor shaft; a stationary brake actuator for hydraulically or mechanically actuating a braking force transmission element that is functionally coupled to the braking force absorption element so as to exert a braking effect; and at least one rotor speed-controlled, centrifugal force-actuated rotor brake deactivation device.

Rotor brakes for helicopters may only be deployed on the ground and only once the (main) rotor has reached a certain speed, which is usually 40% to 50% of the rated rotor speed. Such a limitation is meaningful since, due to aerodynamic forces, the rotor speed drops relatively quickly to about 40% to 50% of the rated rotor speed, but after that, it decreases only relatively slowly. Dimensioning rotor brakes that are already effective at 70% to 100% of the rated rotor speed would entail very strong brakes, a substantial weight of the rotor brake as well as increased manufacturing costs. Therefore, especially in the civilian sector, such a design is neither desired nor, as a rule, necessary.

With conventional rotor brake systems, actuating the rotor brake above a value of 40% to 50% of the rated rotor speed can lead to deformation of components of the rotor brake, particularly of the brake disc, due to excessive thermal loads, in this speed range, excessive braking energy is applied to the brake system. In the extreme case, the structure of safety-relevant brake components such as, for example, the brake disk or the brake drum, can be changed and fail. As an example, mention should be made of the fact that an actuation of the rotor brake at 70% rather than at 50% of the rated rotor speed means that approximately twice as much braking energy has to be absorbed by the rotor brake system.

An operating error can occur with conventional rotor brakes. For example, it is possible for the pilot to accidentally actuate the rotor brake during flight, leading to overheating of the brake system components. Or the rotor brake can be actuated on the ground above the permissible speed of approximately 40% to 50% of the rated rotor speed has been reached which, as already mentioned, might lead to an overheating of the brake system components. With hydraulically activated brakes, an erroneous actuation of the braking function can also occur due to a temperature-related increase in the pressure of the hydraulic system or a malfunction of the hydraulic system.

BRIEF SUMMARY OF THE INVENTION

It is an object of the invention to provide a shaft mounted rotor brake without the disadvantages of the state of the art.

The solution is provided with a shaft mounted rotor brake with the features of claim 1.

According to the invention a shaft mounted rotor brake comprises at least one braking force absorption element non-rotatable connected to said shaft. A stationary brake actuator is mounted to a rotor gear box housing, said stationary brake actuator actuating a braking force transmission element that is functionally coupled to the at least one braking force absorption element so as to exert a braking effect. At least one rotor speed-controlled rotor brake deactivation device is provided for supervision of said stationary brake actuator. The at least one braking force absorption element comprises lamellas connected to said shaft and stationary lamellas non-rotatable connected to said housing, said lamellas interacting with the stationary lamellas. Said lamellas and stationary lamellas are arranged inside of the rotor gear box housing with oil inside.

A first advantage of the invention is that the inventive shaft mounted rotor brake is lubricated by gear box oil. A further advantage of the invention is that the gear box oil system is capable to absorb any additional heat due to any friction in the inventive shaft mounted rotor brake and to filter wear particles from the lamellas. The inventive shaft mounted rotor brake allows a durable rotor brake at reduced maintenance, reduced pilots workload and reduced misuse possibilities by a crew/pilot.

According to a preferred embodiment of the invention the shaft is a drive shaft of the main gearbox. By using an already existing drive shaft the amount of additional parts required for the rotor brake system is minimized, leading to a simple and cost-efficient design.

According to a further preferred embodiment of the invention the shaft is an additional shaft coupled to the drive shaft of the main gearbox for more constructive flexibility.

According to a further preferred embodiment of the invention the rotor speed-controlled rotor brake deactivation device comprises a ring shoulder integral with the shaft, counter springs, centrifugal slides and a ring slide with conical shape. At nominal rotations per minute (rpm) of the shaft the centrifugal slides are pressed against the counter springs in their outer position distal to the shaft. Due to its conical shape the ring slide cannot engage with the centrifugal slide to counter act as an abutment. In case the drive shaft speed is reduced, the centrifugal slides are pushed back by the counter springs to the inner position. If now the rotor brake is actuated, the ring slide engages with the centrifugal slides and the rotor brake is engaged. In case of unintended actuation of the rotor brake above the allowed rpm of the main rotor, the centrifugal slides are not at their inner position and the rotor brake cannot engage.

According to a further preferred embodiment of the invention the rotor speed-controlled rotor brake deactivation device is a rotational speed depending brake actuator, actuated by the centrifugal force of rotating masses installed on the rotating shaft. Below the critical main rotor rpm, the actuator allows the actuation of the rotor brake by the pilot, above the critical main rotor rpm, it is not possible to actuate the rotor brake.

According to a further preferred embodiment of the invention the rotor brake deactivation device is dependent of the pressure of the gear box oil using the dependency between the pressure of the gear box oil and the rotational speed of a main rotor head to prevent the brake from unintended engagement. This has the advantage, that the oil pressure available in the main gearbox can be used for both the brake actuation as well as the brake control.

BRIEF DESCRIPTION OF THE SEVERAL VIEWS OF THE DRAWINGS

A preferred embodiment of the invention is presented with reference to the following description and the attached drawings.

FIG. 3 shows a cross section of a further preferred embodiment of a shaft mounted rotor brake according to the invention;

FIG. 4 shows a cross section of a first operating condition of the further preferred embodiment of FIG. 3;

DETAILED DESCRIPTION OF THE INVENTION

Figure 1:
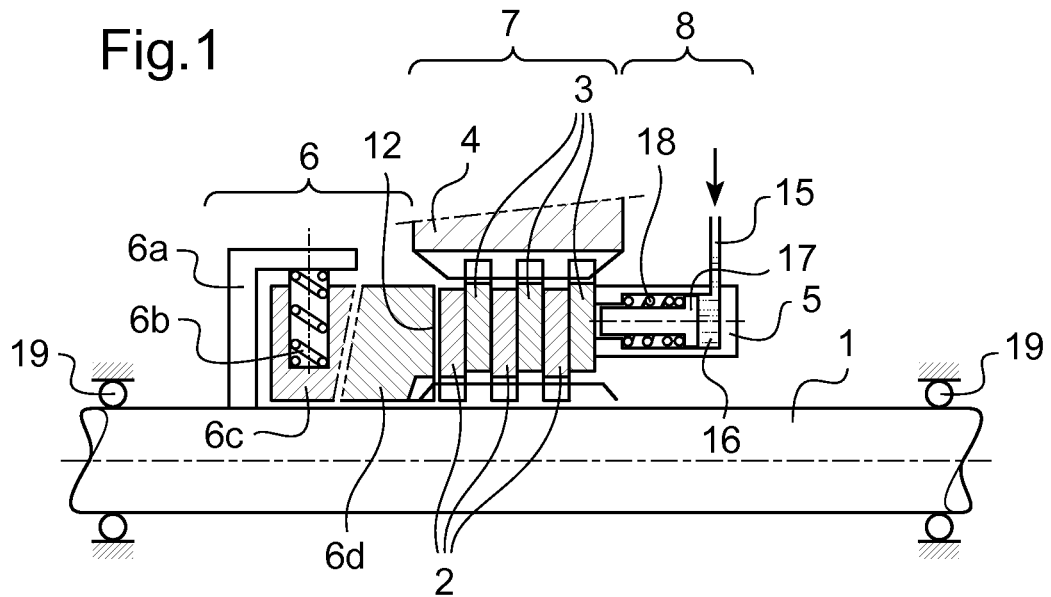
FIG. 1 shows a radial half cross section of a shaft mounted rotor brake according to the invention.

According to FIG. 1 rotating lamellas 2 mounted on a drive shaft 1 of a rotor (not shown) of a helicopter are integrated in a gear box (not shown) with a fix housing 4 encompassing said drive shaft 1. The rotational speed of the drive shaft 1 correlates with the speed of the rotor of the helicopter. The drive shaft 1 is either part of a drive train or part of an additional train dedicated for a rotor brake 7. The drive shaft 1 is supported in bearings 19. The fix housing 4 and the rotor brake 7 are closed around said drive shaft 1 with oil inside.

Several lamellas 2 of the rotor brake 7 are integrated as braking force absorption element and connected via a spline connection to the drive shaft 1. Stationary lamellas 3 as braking force absorption element are mounted in between said lamellas 2 to the housing 4 of the gear box. The brake system 7 is lubricated by the gear box oil capable to absorb the additional heat and to filter any wear particles from the lamellas 2 and stationary lamellas 3.

A rotor brake actuator 8 as stationary brake actuator is actuated hydraulically via a supply line 15 to a hydraulic assembly 5 as a braking force transmission element with a pressure chamber 16 closed by a piston head 17 of said rotor brake actuator 8. A spring 18 pushes the rotor brake actuator 8 away from the rotor brake 7 against the pressure p on the piston head 17 supplied via the supply line 15.

A rotor speed-controlled rotor brake deactivation device 6 is mounted on the shaft 1 to counteract any brake forces from the rotor brake actuator 8 at rotational speeds of the shaft 1 below nominal speed.

The rotor speed-controlled rotor brake deactivation device 6 comprises a ring shoulder 6a, counter springs 6b, conical centrifugal slides 6c radial movable relative to drive shaft 1 and a conical ring slide 6d axially movable on drive shaft 1. The ring shoulder 6a, the counter springs 6b, the conical centrifugal slides 6c and the conical ring slide 6d are concentrically arranged relative to drive shaft 1. The conical centrifugal slides 6c are adjacent to the conical ring slide 6d with the conical centrifugal slides 6c narrowing towards the drive shaft 1 being complementary to the conical ring slide 6d widening towards the drive shaft 1. The conical ring slide 6d is provided with an abutment plate 12 towards the rotor brake 7.

At nominal speed of the drive shaft 1 the centrifugal slides 6c press against the counter springs 6a, said centrifugal slides 6c then being located in an outer position distal to the drive shaft 1. Thus the conical centrifugal slide 6b is removed from the complementary conical ring slide 6d and conical ring slide 6d free to slide axially on drive shaft 1 does not counter act any pressure resulting from brake forces exerted from the rotor brake actuator 8 via the lamellas 2 and stationary lamellas 3. In case of unintended actuation of the rotor brake 7 the slides 6d cannot return to an inner position and the rotor brake 7 cannot engage as the abutment plate 12.

In case the speed of the drive shaft 1 is sufficiently reduced, the conical centrifugal slides 6b are pushed back towards the shaft 1 by the counter springs 6b into the inner position. If now the rotor brake 7 is actuated by the rotor brake actuator 8, the conical ring slide 6d engages with the conical centrifugal slides 6b and the rotor speed-controlled rotor brake deactivation device 6 allows engagement of the rotor brake 7.

Figure 2:
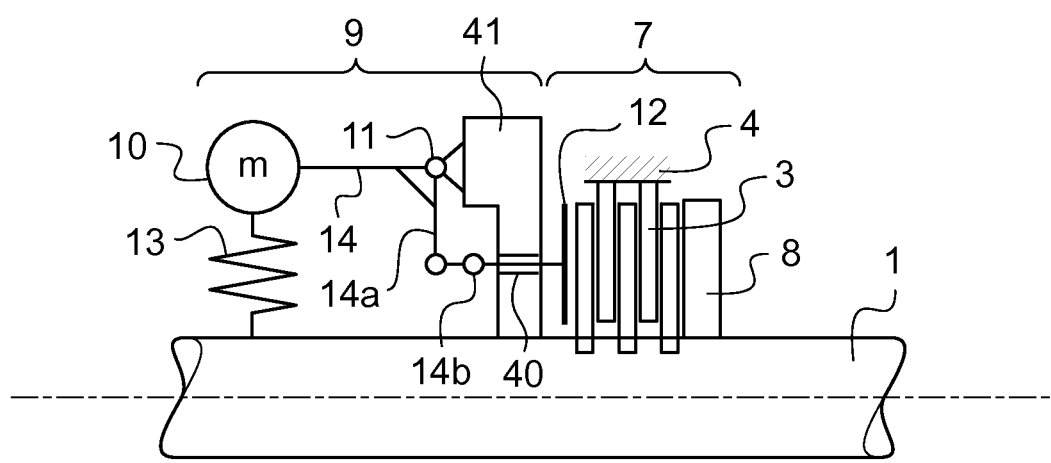
FIG. 2 shows a schematic view of a preferred embodiment of a shaft mounted rotor brake according to the invention.

According to FIG. 2 the same references are applied for corresponding features of FIG. 1. An alternative rotor speed-controlled rotor brake deactivation device 9 comprises a mass 10 attached by a retaining spring 13 to the drive shaft 1. The mass 10 rotates with the drive shaft 1. The mass 10 is fixed to an end of a lever 14, rotating with the drive shaft 1. Said lever 14 is pivotable around a point 11 to allow radial displacement of mass 10 relative to the drive shaft 1. A connecting lever 14a is mounted angularly stiff to lever 14 at point 11 and extends with an articulated rod 14b through a linear bearing 40 in a bearing support 41 rotating with the drive shaft 1. The articulated rod 14b is articulated to the connecting lever 14a and to the abutment plate 12, said abutment plate 12 being adjacent to a lateral lamella 2 of the rotor brake 7 mounted to the drive shaft 1. The articulation of the articulated rod 14b serves to compensate length variations during any brake operations.

If the mass 10 is moved outside away from the shaft 1—due to centrifugal forces from the shaft 1 at nominal rotational speed—the lever 14 is pivoted radial outside. The movement of the lever 14 is transmitted by means of the stiff connection at point 11 to the connecting lever 14a to withdraw the abutment plate 12 via the articulated rod 14b from the lamellas 2, 3 to open the rotor brake 7 at a predetermined rotational speed of the drive shaft 1 related to the spring rate of the retaining spring 13 and the weight of mass 10.

An automatic engagement of the rotor brake 7 is achieved either with pilot activated rotor brake actuator 8 or without pilot activated rotor brake actuator 8.

Independently from the pilot actuator 8 the rotor brake 7 will automatically disengage above a certain speed during start and slow down. The transmission system must cover the produced heat.

According to FIG. 3 the same references are applied for corresponding features of FIGS. 1 and 2. Actuation of the shaft mounted rotor brake 7 is performed by the gear box oil and an actuation piston 26. The dependency on the rotational speed of the pressure p of the gear box oil is used within the actuator 8 to prevent the rotor brake 7 from unintended engagement.

The rotor brake 7 comprises the concentric lamellas 2 on shaft 1 and the concentric stationary lamellas 3 arranged at the housing 4 of the gear box. A concentric brake piston 23 operates the engagement of the interacting lamellas 2, 3. A pressure p in a chamber 24 of the housing 4 pushes the brake piston 23 towards the rotor brake 7 to operate the engagement of the lamellas 2, 3. The chamber 24 is discharged by an outlet 21.

An oil pressure-controlled rotor brake deactivation device 25 comprises an actuator piston 26 and an actuation spring 27 interacting with a control piston 28 in a control casing 30. The operating range of the control piston 28 is limited by an abutment ring 29 in the control casing 30. An oil supply line provides oil pressure to a control piston chamber 31. An oil pressure line 20 to chamber 24 is controlled by the control piston 28 and a non-return valve 22 is supported by a non-return spring 32.

According to FIG. 4 the shaft mounted rotor brake 7 of FIG. 3 is shown in a first operating condition. The actuator piston 26 is actuated at nominal speed of the rotor, e. g. unintentionally by the pilot. Oil pressure p is supplied into the control piston chamber 31 pressing the control piston 28 against the abutment ring 29 in its initial position. Thus the outlet 21 to chamber 24 remains open, no pressure is exerted to brake piston 23 and the rotor brake 7 is not engaged.

Figure 5:
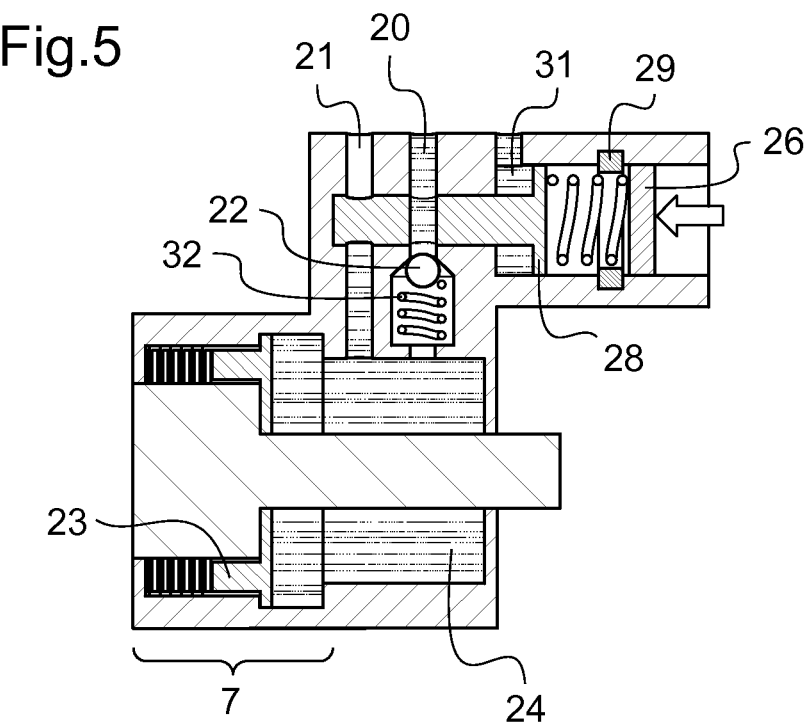
FIG. 5 shows a cross section of a second operating condition of the further preferred embodiment of FIG. 3.

According to FIG. 5 the shaft mounted rotor brake 7 of FIG. 3 is shown in a further operating condition. The speed of the rotor is decreased and consequently the oil pressure supplied to the control piston chamber 31 is reduced. Actuation of the actuator piston 26 lifts the control piston 28 off the abutment ring 29 towards its alternative abutment position blocking the outlet 21 and opening a passage from the oil pressure line 20 to chamber 24 by pushing open the non-return valve 22 against the action from the non-return spring 32. The pressure from the oil pressure line 20 in chamber 24 is exerted to brake piston 23 and the rotor brake 7 is engaged.

Figure 6:
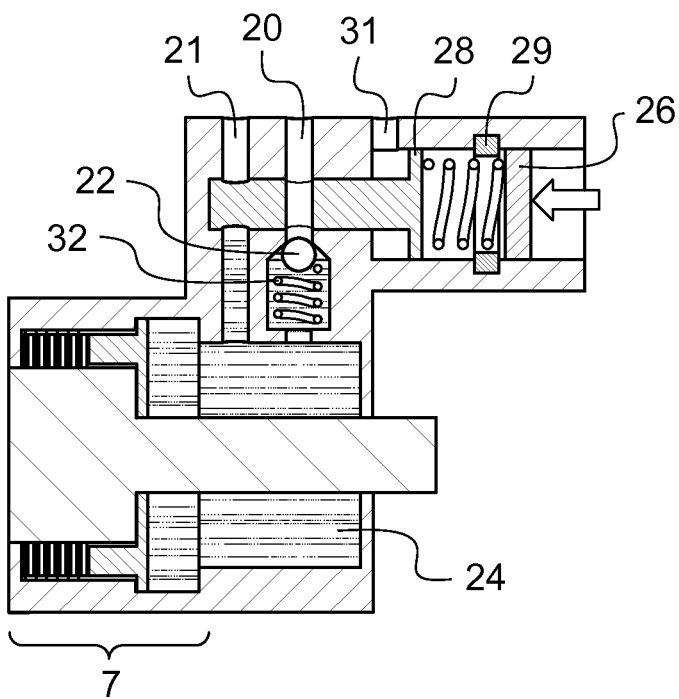
FIG. 6 shows a cross section of a third operating condition of the further preferred embodiment of FIG. 3.

According to FIG. 6 the shaft mounted rotor brake 7 of FIG. 3 is shown in a still further operating condition. The speed of the rotor is still decreased and there is no more any oil pressure supplied to the control piston chamber 31. On-going actuation of the actuator piston 26 keeps the control piston 28 off the abutment ring 29 at its alternative abutment position still blocking the outlet 21 and keeping open the passage from the oil pressure line 20 to chamber 24. Once the chamber 24 is filled with gear box oil the non-return valve 22 is set back on its seat by the action from the non-return spring 32 to block the oil pressure line 20. The pressure in chamber 24 is maintained and the rotor brake 7 remains engaged to prevent the rotor from turning.

To start the rotor the actuator piston 26 is released and the control piston 28 is reset against the abutment ring 29 by the increasing oil pressure, counteracting the actuation spring 27. Thus the control piston 28 opens the outlet 21 and closes the passage from the oil pressure line 20 relieving any pressure in chamber 24. The rotor brake 7 opens and the rotor is prepared for start.

REFERENCE LIST 1 driven shaft
2 lamellas
3 stationary lamellas
4 fix housing
5 hydraulic assembly
6 rotor speed-controlled rotor brake deactivation device
6a ring shoulder
6b counter spring
6c conical centrifugal slides
6d conical ring slide
7 rotor brake
8 rotor brake actuator
9 rotor speed-controlled rotor brake deactivation device
10 mass
11 point
12 abutment plate
13 retaining spring
14 lever
15 supply line
16 pressure chamber
17 piston head
18 spring
19 bearings
20 oil pressure line
21 outlet
22 non return valve
23 brake piston
24 chamber
25 oil pressure-controlled rotor brake deactivation device
26 actuation piston
27 actuation spring
28 control piston
29 abutment ring
30 control casing
31 control piston chamber
32 non return spring
14a connecting lever
14b articulated lever
40 linear bearing
41 bearing support

What is claimed is:

1. A rotor brake device for a helicopter having a main rotor, a gear box for rotatably driving a rotatable shaft of the main rotor, the gear box having a gear box housing with oil inside, the rotor brake device comprising:

at least one braking force absorption element mounted to said rotatable shaft;

a stationary brake actuator mounted to said gear box housing, a braking force transmission element, said stationary brake actuator actuating said braking force transmission element that is functionally coupled to the at least one braking force absorption element, so as to exert a braking effect; and at least one rotor brake deactivation device, wherein the at least one braking force absorption element comprises stationary lamellas and rotary lamellas interacting with the stationary lamellas, said rotary lamellas and stationary lamellas being arranged inside of the gear box housing with oil inside, wherein the rotor brake deactivation device is dependent on a pressure p of oil inside the gear box housing, the pressure being controlled by the rotor speed of the main rotor wherein the brake deactivation device has a control piston in a control casing forming a control piston chamber, the control piston chamber connected to an oil supply line providing oil pressure; and wherein the control casing of the brake deactivation device forms an oil pressure line having a non-return valve and a non-return spring, wherein the oil pressure line is controlled by a position of the control piston and the non-return valve.

2. The rotor brake device according to claim 1, wherein the rotatable shaft is a drive shaft.

3. The rotor brake device according to claim 1, wherein the rotatable shaft is an additional shaft coupled to a drive shaft of the gear box.

4. The rotor brake device according to claim 1, wherein the at least one rotor brake deactivation device comprises a ring shoulder, counter springs, centrifugal slides and a ring slide.

5. The rotor brake device of claim 1 wherein the control casing of the brake deactivation device forms an outlet, wherein the outlet is controlled by a position of the control piston.

6. The rotor brake device of claim 5 wherein the control piston has a first position blocking the oil pressure line, and a second position blocking the outlet.

7. A method for deactivating a rotor brake device for a helicopter; the helicopter having a main rotor, a gear box for rotatably driving a rotatable shaft of the main rotor; the gear box having a gear box housing with oil inside; the method comprising:
providing a rotor brake device having at least one braking force absorption element mounted to said rotatable shaft, a stationary brake actuator mounted to said gear box housing, a braking force transmission element, and at least one rotor brake deactivation device, wherein said stationary brake actuator actuates said braking force transmission element that is functionally coupled to the at least one braking force absorption element so as to exert a braking effect, wherein the braking force absorption element has stationary lamellas and rotary lamellas interacting with the stationary lamellas, the rotary lamellas and stationary lamellas being arranged inside of the gear box housing with oil inside;
controlling a pressure p of oil inside the gear box housing by the rotor speed of the main rotor, the rotor brake deactivation device of the rotor brake device being dependent on the pressure p; and
pressing conical centrifugal slides against a counter spring when a speed of the drive shaft is at a nominal rotational speed such that the conical centrifugal slides are located in an outer position distal to the drive shaft, the conical centrifugal slides being removed from a complementary conical ring slide such that the conical ring slide is made free to slide axially on the drive shaft and the drive shaft does not counter acting a brake force pressure exerted from the brake actuator via the rotary lamellas and stationary lamellas, wherein in case of an unintended actuation of the rotor brake device, the conical centrifugal slides cannot return to an inner position and the rotor brake device cannot engage at an abutment plate.

8. The method of claim 7 further comprising:
pushing back the conical centrifugal slide towards the drive shaft by the counter spring into the inner position when the speed of the drive shaft is lower than a predetermined reduced speed value, such that if the rotor brake device is then actuated by the stationary brake actuator, the conical ring slide engages with the conical centrifugal slide, and the rotor brake deactivation device is rotor-speed controlled and allows engagement of the rotor brake device.

9. A helicopter having a main rotor, a gear box for rotatably driving a rotatable shaft of the main rotor; the gear box having a gear box housing with oil inside; the helicopter further having a rotor brake device comprising:
at least one braking force absorption element mounted to the rotatable shaft;
a stationary brake actuator mounted to the gear box housing,
a braking force transmission element, the stationary brake actuator actuating the braking force transmission element that is functionally coupled to the at least one braking force absorption element, so as to exert a braking effect; and
at least one rotor brake deactivation device,
wherein the braking force absorption element comprises stationary lamellas and rotary lamellas interacting with the stationary lamellas, said rotary lamellas and stationary lamellas being arranged inside of the gear box housing with oil inside; and
wherein the rotor brake deactivation device of the rotor brake device is dependent on a pressure p of oil inside the gear box housing, the pressure p of oil being controlled by a rotor speed of the main rotor; and
wherein the rotor brake deactivation device comprises a ring shoulder, counter springs, conical centrifugal slides radially movable relative to the drive shaft, and a conical ring slide axially movable on the drive shaft, wherein the ring shoulder, the counter springs, the conical centrifugal slides and the conical ring slide are concentrically arranged relative to the drive shaft, the conical centrifugal slides being adjacent to the conical ring slide with the conical centrifugal slides narrowing towards the drive shaft so as to be complementary to the conical ring slide widening towards the drive shaft, the conical ring slide being provided with an abutment plate towards the rotor brake device.

* * * * *